B. HALVÉ.
HARROW.
APPLICATION FILED MAY 13, 1910.
983,894.
Patented Feb. 14, 1911.
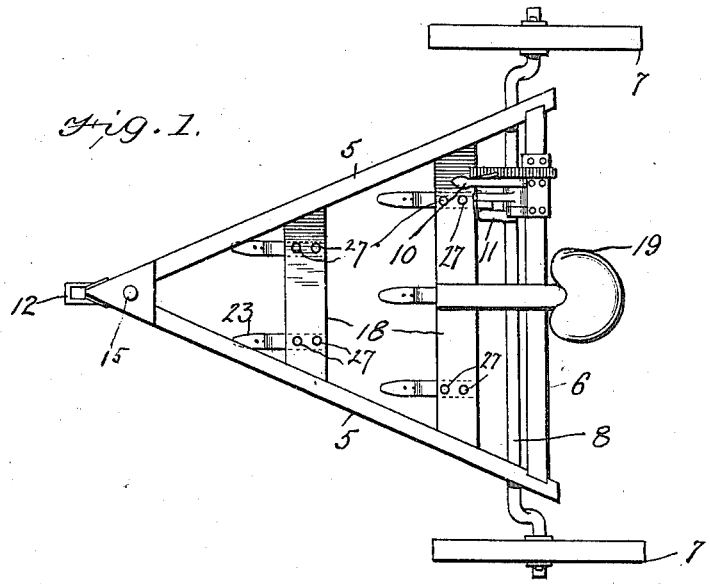
Fig. 1.
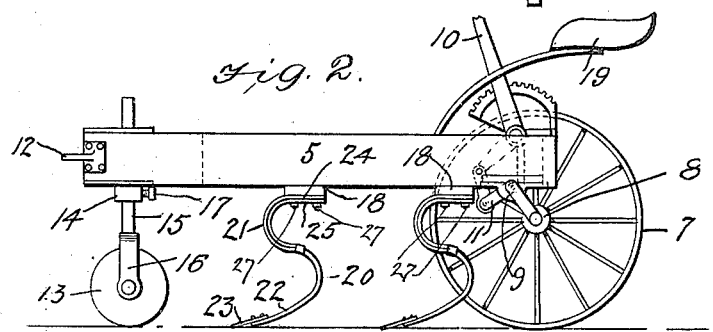
Fig. 2.
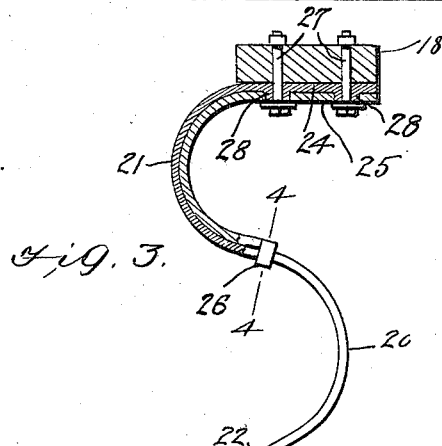
Fig. 3.
Fig. 4.
Witnesses
F. C. Barry
M. C. Jones
Inventor
Bruno Halvé
By Max A. Schmidt
Attorney

UNITED STATES PATENT OFFICE.

BRUNO HALVÉ, OF WACO, TEXAS.

HARROW.

983,894. Specification of Letters Patent. Patented Feb. 14, 1911.

Application filed May 13, 1910. Serial No. 561,036.

*To all whom it may concern:*

Be it known that I, BRUNO HALVÉ, a citizen of the United States, residing at Waco, in the county of McLennan and State of Texas, have invented certain new and useful Improvements in Harrows, of which the following is a specification.

The harrow which is the subject of the present invention is designed more particularly for destroying weeds, grass and other undesirable growths.

It is the object of the invention to provide in a harrow of the kind stated a novel form of spring tooth which cuts the roots of weeds and works the same to the surface of the ground without turning the sod.

Another object of the invention is to provide a spring tooth which is strong and durable, and able to successfully withstand heavy work, and capable of use in stumpy and stony land.

In order that the invention may be fully understood, reference is had to the accompanying drawing forming a part of this specification, in which drawing—

Figure 1 is a plan view of the machine. Fig. 2 is a side elevation thereof. Fig. 3 is a sectional detail of the tooth, and Fig. 4 is a cross section on the line 4—4 of Fig. 3.

Referring to the drawing, the supporting frame of the machine comprises side bars 5 which are spaced at their rear ends and there connected by a cross bar 6. The side bars are brought together at their front ends, thus forming a triangular-shaped structure. However, this shape is immaterial, and may be varied at will.

The frame is supported at its rear end on wheels 7 mounted on an arched axle 8, supported in bearings 9 carried by the bars 5. The axle is free to be rocked in its bearings for the purpose of raising and lowering the frame. The rocking movement of the axle is effected by a hand lever 10 fulcrumed on the cross bar 6, and suitably connected to an arm 11 fixed to, and extending from the axle.

To the front end of the frame is attached a clevis 12, and this end is supported on a vertically adjustable and swiveled caster wheel 13. The vertical adjustment of the caster wheel is effected by a collar 14 which is adjustably fastened to the stem 15 of the wheel supporting frame 16 by a set screw 17, the collar being located under the front end of the frame and engaged thereby.

The bars 5 carry spaced parallel cross beams 18 on which the teeth are mounted. Two of these beams are shown, the front one carrying two teeth, and the rear one three teeth. The teeth of one beam are so set with respect to the teeth of the other beam, that each tooth travels in a separate row. One of the beams 18 also supports the driver's seat 19.

The several teeth are identical in form and construction, in view of which a description of one will suffice for all. Referring more particularly to Fig. 3, the tooth shown somewhat resembles the letter S, its shank having two curved portions 20 and 21, respectively. The penetrating portion 22 of the tooth extends downwardly and forwardly from the lower curve 20, and carries at its point a sweep or shovel 23. The upper curve 21 is made in a direction opposite the direction of the lower curve, and from said upper curve, the shank extends rearwardly and horizontally in a straight line, as indicated at 24, to facilitate attachment to the beam 18. The tooth herein described is reinforced by a strip 25 of spring metal having the same width as that of the tooth. This reinforcing strip is placed against the back of the tooth, and extends along the portion 24 on the bottom thereof, and around the curve 21, at the back thereof, and terminates at a point substantially midway between said curve and the curve 20, its extremity being formed with two spaced outstanding flanges 26, between which the tooth shank extends, said flanges extending across opposite edges of the shank. The tooth is secured to the beam 18 by bolts 27 passing through the beam and the portion 24 of the tooth shank, and also through bosses 28 formed on said portion 24 and extending into openings in the strip 25, whereby a rigid connection between the tooth and the beam is had, and the reinforcement is securely fastened to the tooth.

In operation, the axle 8 is adjusted so as to lower the teeth sufficiently to enter the ground the desired distance. The part 22 of the tooth travels through the soil with a pronounced and continuous vibratory motion, due to the great resiliency of the tooth resulting from the two curved portions, and the reinforcement. The shovel 23 cuts the roots of the weeds, grass and other undesirable growths, and the vibratory motion of the tooth works the roots upwardly to the surface of the ground, where they may remain to dry, or to be collected and destroyed. The shovel operates as stated without turning the sod. The flanges 26 prevent relative lateral play of the tooth and its reinforcement. The reinforcement also imparts sufficient strength to the tooth, so that the machine may be operated in stumpy and stony land without danger of having the teeth broken. The machine can also be used for cultivating hard soil, the shovels, by reason of the great strength of the teeth, readily entering the soil, and throwing up clods, weeds and stones. If the shovel encounters a root, stone or other obstruction, the tooth bends rearwardly on the curves and by reason of the greatly augmented resiliency from the reinforcement, the obstruction is torn loose and worked to the surface of the ground. The tooth is loose between the flanges 26, and is therefore free to yield.

I claim:

A spring tooth for harrows and the like, comprising a shank having upper and lower opposite curves, and a straight attaching portion extending rearwardly from the upper curve, a spring reinforcing strip extending along the bottom of the attaching portion, and behind the upper curve, said strip terminating between the upper and lower curves, and having outstanding flanges at its terminal between which the tooth fits loosely, a boss on the bottom of the aforesaid straight portion of the tooth shank, and extending through the reinforcing strip engageable with said portion, and a bolt passing through the boss.

In testimony whereof I affix my signature in presence of two witnesses.

BRUNO HALVÉ.

Witnesses:
A. M. KENNEDY,
E. D. RUSSELL.